United States Patent
Oka et al.

(10) Patent No.: US 12,303,943 B2
(45) Date of Patent: May 20, 2025

(54) FEATHER SEPARATION SYSTEM AND FEATHER SEPARATION METHOD, AND METHOD FOR PRODUCING RECYCLED FEATHERS

(71) Applicant: TORAY INDUSTRIES, INC., Tokyo (JP)

(72) Inventors: Naoki Oka, Otsu (JP); Tamotsu Suzuki, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 404 days.

(21) Appl. No.: 17/913,939

(22) PCT Filed: Mar. 11, 2021

(86) PCT No.: PCT/JP2021/009787
§ 371 (c)(1),
(2) Date: Sep. 23, 2022

(87) PCT Pub. No.: WO2021/200013
PCT Pub. Date: Oct. 7, 2021

(65) Prior Publication Data
US 2023/0347383 A1    Nov. 2, 2023

(30) Foreign Application Priority Data

Mar. 31, 2020  (JP) ................. 2020-065010
Mar. 31, 2020  (JP) ................. 2020-065011

(51) Int. Cl.
*B07B 7/01* (2006.01)
*B07B 11/06* (2006.01)
*B68G 3/00* (2006.01)

(52) U.S. Cl.
CPC ............. *B07B 7/01* (2013.01); *B07B 11/06* (2013.01); *B68G 3/00* (2013.01)

(58) Field of Classification Search
CPC .. B07B 4/02; B07B 7/02; B07B 7/083; B07B 7/01; B07B 11/06; B07B 11/02; B68G 3/00
See application file for complete search history.

(56) References Cited

U.S. PATENT DOCUMENTS 3,618,761 A * 11/1971 Francis .............. B07B 9/02
                                                    209/139.1
3,779,377 A * 12/1973 Phelps ............. A01D 33/08
                                                    209/36

(Continued)

FOREIGN PATENT DOCUMENTS

| CN | 101622192 A | 1/2010 |
| CN | 102303838 A | 1/2012 |

(Continued)

OTHER PUBLICATIONS

Extended European Search Report for European Application No. 21780657.9, dated Mar. 28, 2024.

(Continued)

*Primary Examiner* — Patrick H Mackey
(74) *Attorney, Agent, or Firm* — Birch, Stewart, Kolasch & Birch, LLP

(57) ABSTRACT

Provided is a feather separation system for separating feathers from a product in which feathers are filled into a bag-shaped product of a covering. The feather separation system includes: a cutting part configured to cut the product into individual pieces so that at least a part of the bag-shaped product of the covering is open; a feather separation part configured to separate the individual pieces of the product into the feathers and the covering; and an airflow introduction part configured to introduce airflow to the feather separation part.

15 Claims, 7 Drawing Sheets

(56) References Cited

U.S. PATENT DOCUMENTS

| | | | | |
|---|---|---|---|---|
| 3,917,567 A | * | 11/1975 | Barrett | B07B 7/02 |
| | | | | 209/36 |
| 4,010,096 A | * | 3/1977 | Murray | B07B 4/02 |
| | | | | 209/139.1 |
| 11,724,264 B2 | * | 8/2023 | Trojosky | B03B 4/02 |
| | | | | 209/132 |
| 2024/0100569 A1 | * | 3/2024 | Stienemann | G05B 19/4155 |

FOREIGN PATENT DOCUMENTS

| | | | | |
|---|---|---|---|---|
| CN | 103752590 A | * | 4/2014 | |
| CN | 204281925 U | | 4/2015 | |
| CN | 109706528 A | | 5/2019 | |
| CN | 109925933 A | | 6/2019 | |
| CN | 209508479 U | | 10/2019 | |
| CN | 212418705 U | * | 1/2021 | |
| JP | 62-137087 A | | 6/1987 | |
| JP | 2001-17754 A | | 1/2001 | |
| JP | 2009-247645 A | | 10/2009 | |
| JP | 4936014 B2 | | 5/2012 | |
| WO | WO 01/22797 A1 | | 4/2001 | |

OTHER PUBLICATIONS

Chinese Office Action and Search Report for Chinese Application No. 202180025671.1, dated Sep. 16, 2023, with English translation.
International Search Report, issued in PCT/JP2021/009787, PCT/ISA/210, dated May 25, 2021.
Written Opinion of the International Searching Authority, issued in PCT/JP2021/009787, PCT/ISA/237, dated May 25, 2021.
Chinese Office Action and Search Report for Chinese Application No. 202180025671.1, dated Jun. 7, 2024, with an English translation.

* cited by examiner

FEATHER SEPARATION SYSTEM AND FEATHER SEPARATION METHOD, AND METHOD FOR PRODUCING RECYCLED FEATHERS

FIELD

The present invention relates to a feather separation system and a feather separation method that separate feathers from a product in which feathers are filled and a method for producing recycled feathers.

BACKGROUND

Feathers are used as bedding and clothing fillings. Feathers used for the bedding are reused by cutting and breaking down the bedding that is manually hung and thereafter vacuuming and collecting the feathers in the bedding when the feathers are recycled. However, this process has a problem in collection efficiency and working environment due to scatter of the feathers. On the other hand, in clothing or the like, the amount of used feathers is small and thus manual separation and collection of the feathers are inefficient. Therefore, these feathers are difficult to reuse.

In recent years, the efficient reuse of feathers used for the bedding and the clothing is aspired from the viewpoints of environment and ethics. Although techniques for separating down and non-down feathers from feathers have been developed (for example, refer to Patent Literatures 1 to 3), no study has been conducted for techniques to efficiently collect the feathers covered with a covering such as fabrics.

CITATION LIST

Patent Literature

Patent Literature 1: Japanese Patent Application Laid-open No. S62-137087
Patent Literature 2: Japanese Patent No. 4936014
Patent Literature 3: Chinese Utility Model No. 204281925

SUMMARY

Technical Problem

The present invention is made in view of the above situation and an object of the present invention is to provide a feather separation system and a feather separation method that efficiently separate and collect feathers from products in which the feathers are filled into a bag-shaped product of a covering and a method for producing recycled feathers.

Solution to Problem

To solve the problem described above and to achieve the object, a feather separation system according to the present invention is a feather separation system for separating feathers from a product in which feathers are filled into a bag-shaped product of a covering. The feather separation system includes: a cutting part configured to cut the product into individual pieces so that at least a part of the bag-shaped product of the covering is open; a feather separation part configured to separate the individual pieces of the product into the feathers and the covering; and an airflow introduction part configured to introduce airflow to the feather separation part.

The feather separation system according to the present invention further includes: a feather collection part configured to store the separated feathers; and a covering collection part configured to store the separated covering.

In the feather separation system according to the present invention, the cutting part is configured to cut the covering of the product so that an area S of the covering of the product is larger than 1 cm$^2$ and less than 400 cm$^2$, and D/L is in a range of D/L<10 where D is a diameter of a smallest circumscribed circle of the individual pieces of the cut covering and L is a distance between smallest circumscribed parallel lines of the individual pieces of the cut covering.

In the feather separation system according to the present invention, the feather separation part includes a separation tank having a cylindrical shape at least in a part of the separation tank, a feather charge part configured to charge the cut individual pieces, a feather discharge part configured to discharge the separated feathers, a rotating shaft located at a center of a cylinder of the separation tank, the rotating shaft including a plurality of stirring rods at different positions in a height direction, and a covering discharge part configured to discharge the separated covering.

In the feather separation system according to the present invention, the stirring rods are provided at least at a lower part lower than the feather charge part.

In the feather separation system according to the present invention, the separation tank has a shape formed by joining two cylinders at sides of the two cylinders and the rotating shaft is provided at each center of the two cylinders.

In the feather separation system according to the present invention, a rotation speed of the rotating shaft is 100 rpm or more and 1000 rpm or less.

In the feather separation system according to the present invention, a stirring rod having a function of preventing the covering from mixing into the feather discharge part are provided at an upper part of the rotating shaft above the feather charge part.

In the feather separation system according to the present invention, a stirring rod arranged at a lowermost part among the stirring rods is a scraping rod for the covering separated from the feathers.

In the feather separation system according to the present invention, the separation tank is obliquely arranged so that the rotating shaft forms an angle of 15° to 80° from a horizontal direction.

In the feather separation system according to the present invention, the airflow introduction part is configured to introduce airflow having a velocity of 0.1 m/second or more and 1.0 m/second or less inside the separation tank.

In the feather separation system accord in to the present invention, the airflow introduction part is connected to the feather collection part.

A feather separation method according to the present invention is a feather separation method for separating feathers from a product in which feathers are filled in a bag-shaped product of a covering. The feather separation method includes: a cutting step of cutting the product into individual pieces so that at least a part of the bag-shaped product of the covering is open; a feather separating step of separating the individual pieces of the product into the feathers and the covering by a stirring means and airflows and a feather collecting step of collecting the separated feathers.

In the feather separation method according to the present invention, the separation step includes carrying feathers alone together with flow of air from a separation tank by forming a mined state made of the covering, the feathers, and air with the stirring means in the separation tank and introducing the airflow in the separation tank.

In the feather separation method according to the present invention, the cutting step includes cutting the covering of the product so that an area S of the covering of the product is more than 1 cm² and less than 400 cm², and D/L is in a range of D/L<10 where D is a diameter of a smallest circumscribed circle of the individual pieces of the cut covering and L is a distance between smallest circumscribed parallel lines of the individual pieces of the cut covering.

In the feather separation method according to the present invention, the feather separation step includes separating the feathers by introducing the airflow having a velocity of 0.1 m/second or more and 1.0 m/second or less.

A method for producing recycle feathers according to the present invention includes the feather separation method.

Advantageous Effects of Invention

According to the present invention, feathers can be continuously and efficiently separated in a feather separation part from a product that is broken into individual pieces in a cutting part and feathers having a high down ratio can be collected.

According to the present invention, the feathers stuck to the covering due to static electricity or the like and the feathers filled in the covering can be efficiently beaten out and separated by mechanically striking the feathers covered with the covering using stirring rods attached to a rotating shaft.

DESCRIPTION OF EMBODIMENTS

Hereinafter, embodiments for implementing the present invention (hereinafter, refers to as "embodiments") will be described with reference to the attached drawings. It should be noted that the drawings are only schematic views and the shapes, sizes, and positional relations are schematically illustrated to the extent that the contents of the present invention can be understood. In other words, the present invention is not limited only to the shapes, sizes, and positional relations illustrated in each of the drawings in addition, parts that differ from each other in dimensions and proportions among the reciprocal drawings are included.

EMBODIMENTS

Figure 1:
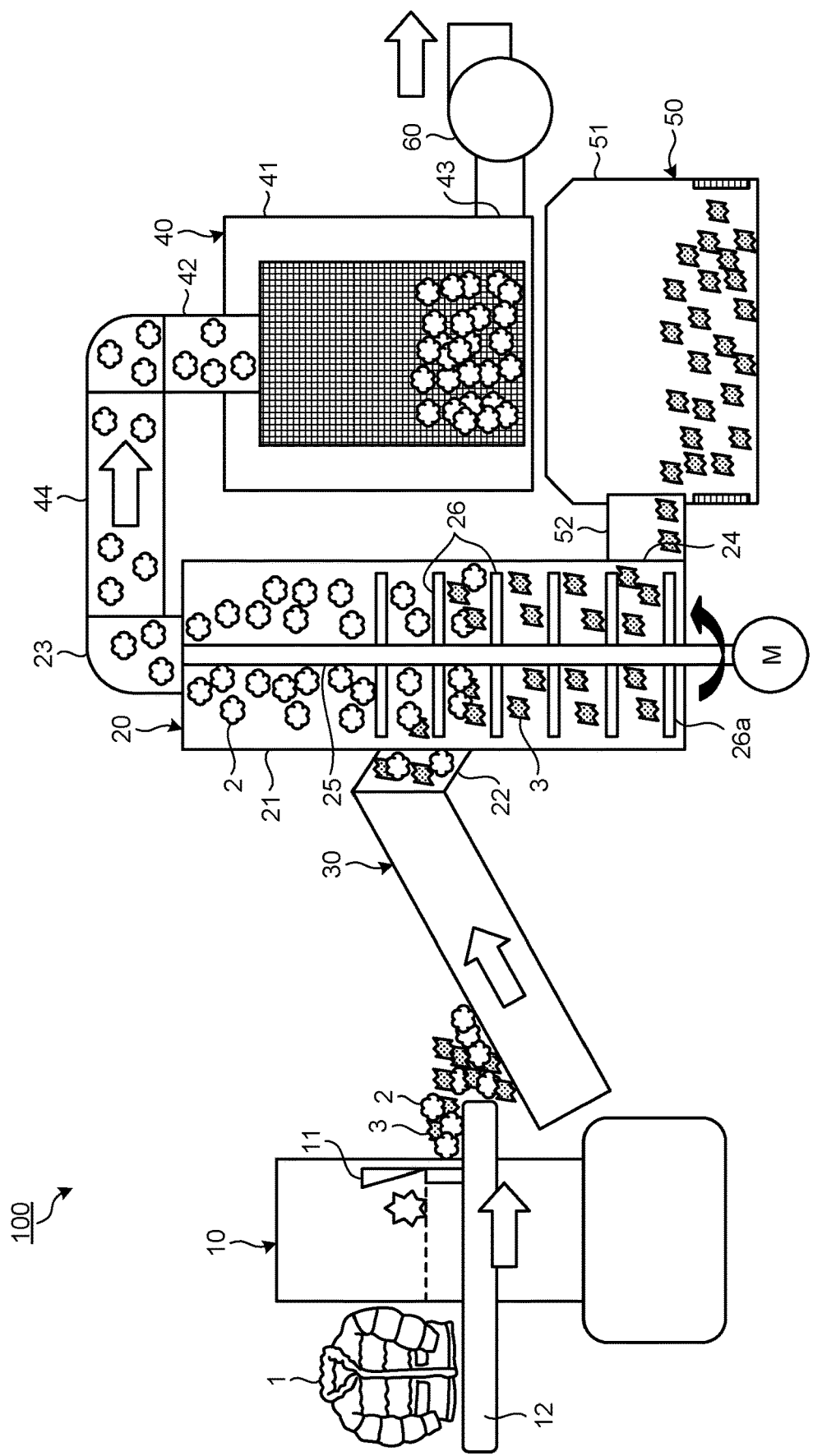
FIG. 1 is a schematic view of a feather separation system according to an embodiment.

FIG. 1 is a schematic view of a feather separation system 100 according to an embodiment. The feather separation system 100 for separating feathers from a product 1 in which feathers are filled into a bag-shaped product of a covering 3 includes a cutting part 10 for cutting the product 1 into individual pieces so that at least a part of the bag-shaped product of the covering 3 is open; a feather separation part 20 for separating the individual pieces into feathers 2 and the covering 3; a conveying part 30 for conveying the individual pieces cut in the cutting part 10 to the feather separation part; a feather collection part 40 for storing the separated feathers 2; a covering collection part 50 for storing the separated covering 3; and an airflow introduction part 60 for introducing airflow to the feather separation part.

The feathers to be separated by the feather separation system 100 according to this embodiment are feathers that are filled in a bag-shaped product of the covering. As the product 1 in which feathers are filled in the bag-shaped product of the covering, bedding and clothing can be exemplified. Generally, when feathers are used as filling for bedding or clothing, the covering is sewn or joined together with an adhesive to a predetermined size in order to reduce uneven distribution of the feathers and a predetermined amount of the feathers are filled in the bag-shaped product of the covering formed by the sewing or joining. The feathers that are the target of separation in this embodiment are feathers that are filled in a bag-shaped covering formed by sewing or joining.

The cutting part 10 includes a cutter 11 and a conveying part 12. The cutter 11 may be a cutter for individualizing the product 1 in one stage or a cutter for cutting the product 1 in two stages in a longitudinal direction and a transverse direction. In the case where the cutter 11 cuts the product 1 in two stages, a constitution in which the conveying part 12 is arranged in an L-shape and the product is cut in a longitudinal direction or a transverse direction, thereafter the conveying direction is changed by 90°, and thereafter the cut product is cut in the transverse direction or the longitudinal direction is preferable from the viewpoint of space saving.

Figure 2:
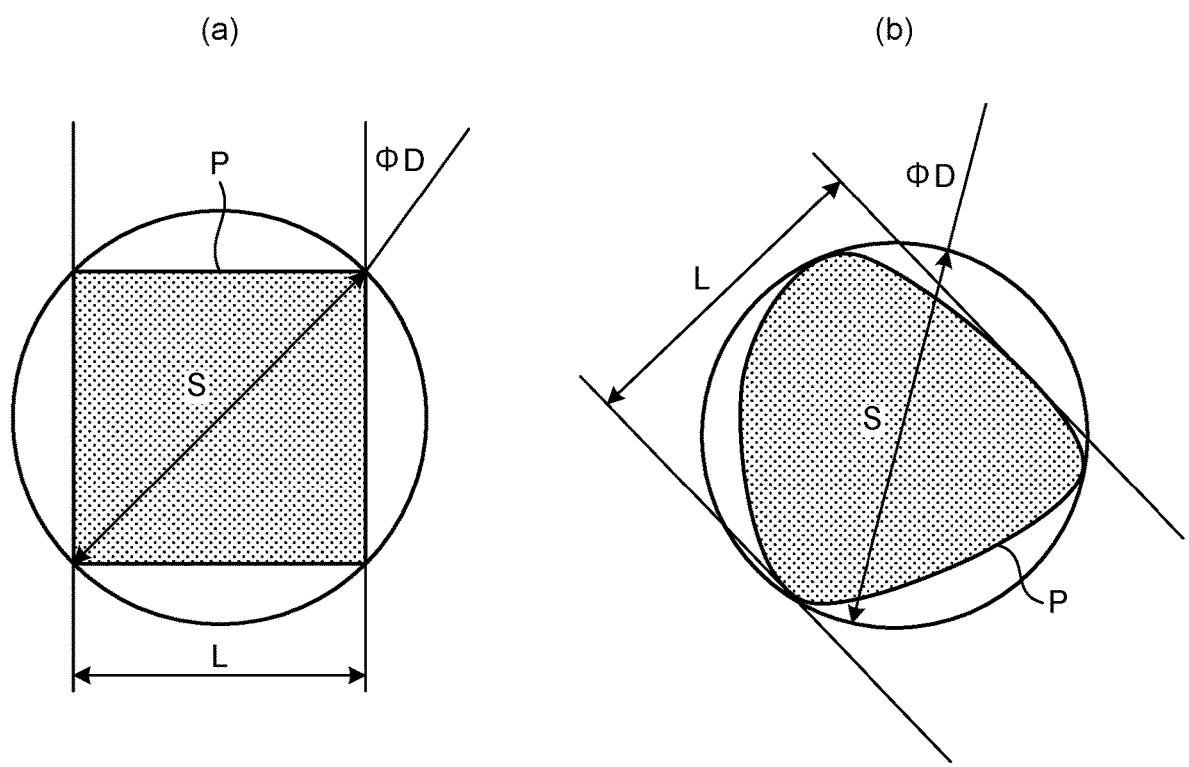
FIG. 2 is a view illustrating cutting of a covering.

The cutting part 10 cuts the product 1 into individual pieces so that a part of the bag-shaped product of the covering 3 opens. Separation of the feathers 2 is possible as long as at least a part of the bag-shaped product of the covering 3 opens. The product 1 is preferably cut so that two sides of the bag-shaped product open. With respect to the covering, the area S of the covering cut into pieces is preferably larger than 1 cm² and smaller than 400 cm² and further preferably larger than 10 cm² and smaller than 100 cm² from the viewpoint of collection ratio. The area S of the covering is defined as an area in a state where the cut covering is spread as much as possible on a flat plate. The covering is preferably cut so that D/L is in the range of D/L<10 and further preferably cut so that D/L is in the range of D/L<4 where D is the diameter of the smallest circumscribed circle of the cut covering and L is the distance between the smallest circumscribed parallel lines. Reducing the ratio of the diameter D of the smallest circumscribed circle of the covering and the distance L between the smallest circumscribed parallel lines allows entanglement of the covering on a rotating shaft 25 and stirring rods 26 to be prevented. FIG. 2 is a view illustrating the cutting of the covering. FIG. 2(a) illustrates the case where the individual piece P of the cut covering is rectangular, whereas FIG. 2(b) illustrates the case where individual piece P is other than rectangular. Keeping the ratio of the diameter P of the smallest circumscribed circle and the distance L between the smallest circumscribed parallel lines of the individual piece P of the covering low allows the entanglement of the covering on the rotating shaft 25 and stirring rods 26 to be prevented and the opportunity to cut down to be reduced. The area S of the individual piece P of the cut covering is preferably cut to a size that is 10% or more and 100% or less of the area of a single unit of the bag-shaped product when the area S is represented relative to the area of the bag-shaped product.

The feather separation part 20 includes a separation tank 21 having a cylindrical shape with an inner cavity in at least a part, a feather charge part 22 for charging the cut and individualized product 1, a feather discharge part 23 for discharging the separated feathers 2 from the covering 3, a rotating shaft 25 located in the center of the cylinder of the separation tank 21 and having a plurality of stirring rods 26 at different positions in a height direction, and a covering discharge part 24 for discharging the separated covering 3.

The feather separation part 20 separates the feathers 2 covered with the covering 3 from the covering 3 by striking the individual pieces, that is, the covering 3 in which the feathers 2 are filled falls by its own weight with the rotating stirring rods 26 by rotating the rotating shaft 25. The feathers 2 are stuck to the covering 3 by static electricity or filled in the bag-shaped product of the covering 3 and thus can be separated from the covering 3 by mechanically striking with the stirring rods 26.

In order to efficiently separate the feathers 2 and the covering 3, the separation tank 21 preferably has a predetermined height. The height of the separation tank 21 is preferably twice or more of the diameter of the separation tank 21 and more preferably three times or more of the diameter. An excessively high height of the separation tank 21 results in large equipment, does not allow the tank to be installed in a space-saving manner, and causes difficulty in maintenance and cleaning. Consequently, the height is more preferably 5 times or less and further preferably 4 times or less of the diameter.

The feather charge part 22 is located above the center of the separation tank 21 in the height direction. Locating the feather charge part 22 on the upper part wall of the separation tank 21 in the height direction allows the stirring rods 26 to strike individual pieces for a given time without increasing the air velocity of the airflow introduced into the separation tank 21 and thus the collection ratio and the down ratio to be improved.

The feather discharge part 23 is located at the upper part of the separation tank 21. The covering discharge part 24 is located at the lower part of the separation tank 21. The feathers 2 have a lower specific gravity than the covering 3 and thus the feathers 2 separated from the covering 3 are carried to the upper part of the separation tank 21 by the airflow flowing from the lower part to the upper part in the separation tank 21 and discharged from the feather discharge part 23. On the other hand, the covering 3 having a higher specific gravity falls to the lower part of the separation tank 21 due to its own weight and is discharged from the covering discharge part 24. The feather discharge part 23 is preferably arranged in the center of the upper surface of the separation tank 21. Centrifugal force acts by the rotation of the rotating shaft 25 and the covering 3 having a higher specific gravity is blown to the outsides of the cylinder and effectively falls down. The airflow is formed in the center side of the separation tank 21 and thus the feathers 2 separated from the covering 3 can be effectively discharged from the feather discharge part 23 arranged at the center of the separation tank 21 by riding on this airflow.

The stirring rods 26 are attached to the rotating shaft 25 at different positions. In this embodiment, two stirring rods 26 extend in a straight line at the same height and opposite each other using the rotating shaft 25 as the center. The stirring rods 26 extend from the rotating shaft 25 so as to be orthogonal (rotated) 90° to the stirring rod 26 at the adjacent height. In order to efficiently separate the feathers 2 covered with the covering 3, frequent mechanical contact is preferably performed with the stirring rods 26. Therefore, the stirring rods 26 attached to the rotating shaft 25 are not limited to two rods at the same height. The extending stirring rods 26 may be arranged so that the three rods are arranged at the same height forming an angle of 120° or four rods are arranged at orthogonal angles. Even when the number of stirring rods 26 attached at the same position is increased, the stirring rods 26 are preferably arranged so as not to overlap with stirring rods 26 arranged at an adjacent height. An excessively large number of the stirring rods 26 arranged at the same position may cause airflow generated in the separation tank 21 to be obstructed. Therefore, the number of the stirring rods 26 attached to the same position of the rotating shaft 25 is preferably set to 8 or less. The stirring rods 26 are not required to be a rod-shaped rigid body and may be rods attached to the rotating shaft 25, deformed by the action of centrifugal force while the rotating shaft 25 is rotating, and rotating in a state where the rods radially extend approximately perpendicular to the rotating shaft 25.

In this embodiment, six pairs of the stirring rods 26 are attached at different heights. The covering 3 covering the feathers 2 that is in mechanical contacted with the stirring rods 26 and the covering 3 separated from the feathers 2 may be bounced up to the upper part of the separation tank 21 due to mechanical contact with the stirring rods 26. In order to prevent the covering 3 that covers the feathers 2 and the covering 3 separated from the feathers 2 from being discharged from the feather discharge part 23, at least one pair of stirring rods are attached to above the feather charge part 22.

As the length of the stirring rods 26 becomes longer, the stirring rods 26 become, preferable because the number of contacts with the feathers 2 covered with the covering 3 increases. The rotating diameter of the stirring rods 26 (Diameter of rotating shaft 25+Length of stirring rod 26×2) is preferably 80% or more, more preferably 90% or more, and further preferably 95% or more of the diameter of the cylinder constituting the separation tank 21. In order to avoid interference with the separation tank 21, the rotating diameter of the stirring rod 26 is 99% or less and preferably 98% or less of the diameter of the cylinder.

Of the stirring rods 26 attached to the rotating shaft 25, the stirring rods 26 arranged at a lowermost part function as scraping rods 26a that scrape out the covering 3 separated from the feathers 2. The scraping rods 26a are preferably attached at the lowermost part where the scraping rods 26a do not come into contact with the bottom surface of the separation tank 21.

In this embodiment, the rotation speed of the rotating shaft 25 can be appropriately selected depending on the cut size of the covering 3 and the speed of the airflow and is preferably 100 rpm or more and more preferably 400 rpm or more. Increasing the rotation speed of the rotating shaft 25 allows the number of contacts between the stirring rods 26 and the covering 3 to increase and thus the separation efficiency to be improved. The upper limit is preferably 1,000 rpm or less from the viewpoint of consumption energy and efficiency.

The feather collection part 40 includes a collection tank 41 for storing the feathers 2, a charge part 42 that is provided above the collection tank and in which the separated feathers 2 are charged, and a ventilation opening 43 that connects an airflow introduction part 60 described below. The charge part 42 of the feather collection part 40 is connected to the feather discharge part 23 of the feather separation part 20 by a pipe 44 or other means. In this embodiment, one collection tank 41 exists. However, a constitution in which two collection tanks 41 are alternately used by providing a three-way valve in the pipe 44 may be adopted.

The covering collection part 50 includes a storing part 51 for storing the covering 3 and a charge part 52 for charging the separated covering 3. In order to collect the covering 3 from the covering discharge part 24 by the own weight of the covering 3, the covering collection part 50 is preferably arranged at the lower part of the feather separation part 20.

Figure 3:
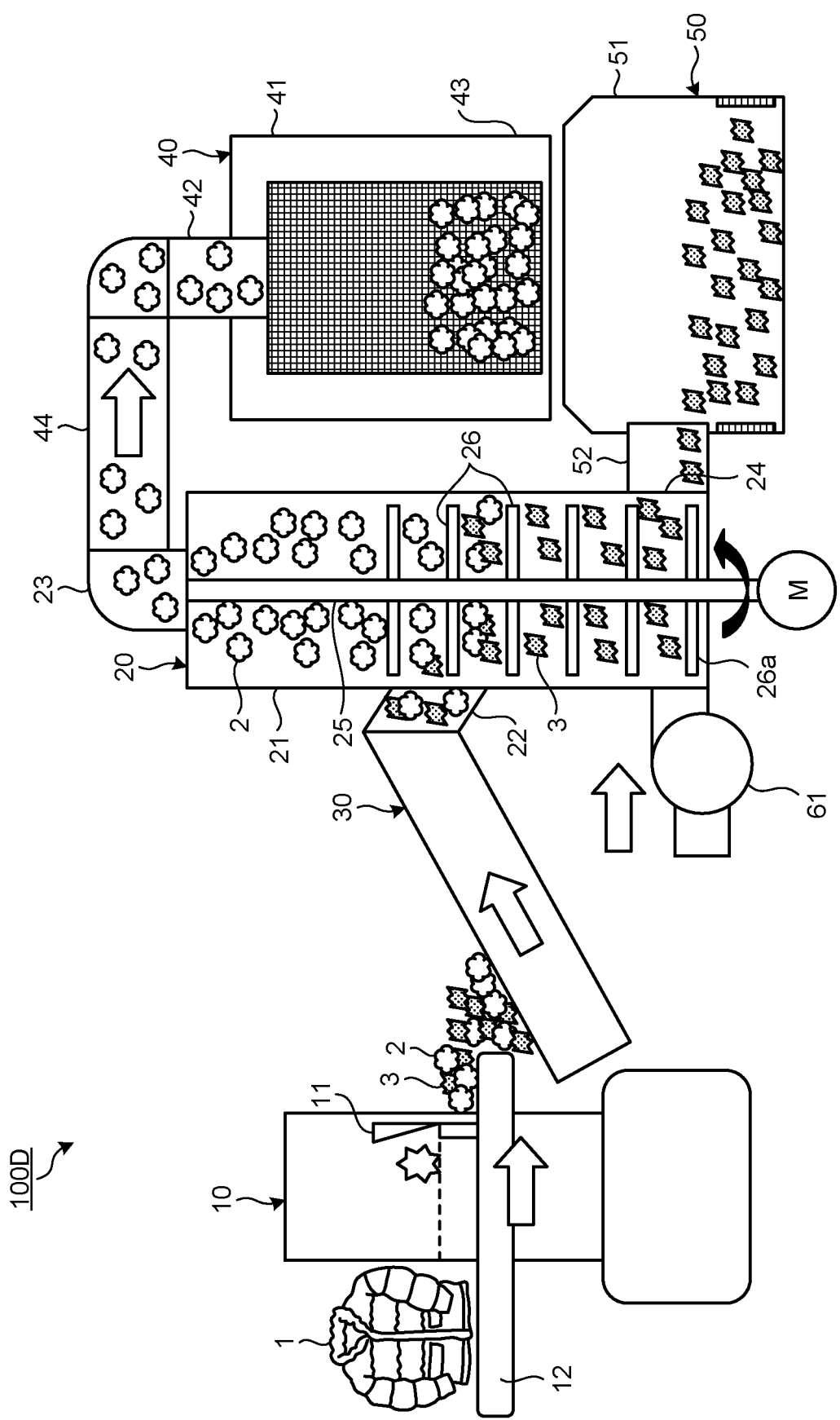
FIG. 3 is a schematic view of a feather separation system according to Modified Example 1 of the embodiment.

The airflow introduction part 60 that introduces the airflow into the separation tank 21 of the feather separation part 20 is attached to the ventilation opening 43 of the feather collection part 40, as illustrated in FIG. 1 as an example. In this case, a suction blower or a similar device can be used as the airflows introduction part 60. In this embodiment, the airflow introduction part is arranged at the ventilation opening 43 of the feather collection part 40 and may also be provided in the pipe 44 that connects the feather separation part 20 and the feather collection part 40. FIG. 3 is a schematic diagram of the feather separation system 100D according to Modified Example 1 of this embodiment. As illustrated in FIG. 3, a blowing fan may be provided at the lower part of the separation tank 21 as an airflow introduction part 61.

The velocity of the airflow introduced into the separation tank 21 by the airflow introduction part 60 is defined as a value obtained by dividing the total airflow through the separation tank by a cylindrical-shaped cross-sectional area constituting the separation tank 21 and is preferably 0.1 m/se or more and 1.0 m/sec or less. As the velocity of the airflow becomes lower, the ratio of down in the feathers 2 discharged from the feather discharge part. 23 becomes larger. On the other hand, an excessively low air velocity causes the airflow capacity of the separated feathers 2 to be lowered and thus the collection ratio of the feathers 2 per hour to be lowered. Conversely, an excessively high air velocity may increase possibility that the discharged feathers are mixed with the separated covering. The velocity of the airflow introduced into the separation tank 21 further preferably 0.3 m/sec or more and 0.5 m/sec or less.

In this embodiment, the individual pieces of product 1 formed by cutting in the cutting part 10 are conveyed by the conveying part 30 to the feather charge part 22 in the feather separation part 20. However, a constitution in which the individual pieces are directly charged from the cutting part 10 to the feather charge part 22 without using the conveying part 30 may also be adopted.

As described above, the feather separation system 100 according to this embodiment cuts the product 1 in the cutting part 10 and automatically conveys the cut product to the feather separation part 20 by the conveying part 30 to separate and collect the feathers. Therefore, the feathers 2 can be efficiently collected from the product 1 with a compact system. The feathers 2 alone can be continuously and effectively separated even in a system having a relatively small separation tank 21 by mechanically contacting the feathers 2 covered with the covering 3 with the stirring rods 26 and separating from the covering 3 by striking to effectively form a mixing state where the covering 3 and the feathers 2 are surely separated and by flowing airflow that can float the feathers alone in the feather separation part 20. In order to efficiently separate and collect the feathers from the product, a feather separation system equipped with the cutting part, the feather separation part, and the airflow introduction part is preferable. However, in a feather separation apparatus in which the airflow introduction part is directly connected to the feather separation part as the feather separation part of Modified Example illustrated in FIG. 3, the feathers can be separated and collected from the individual pieces in which at least a part of the covering opens.

Figure 4:
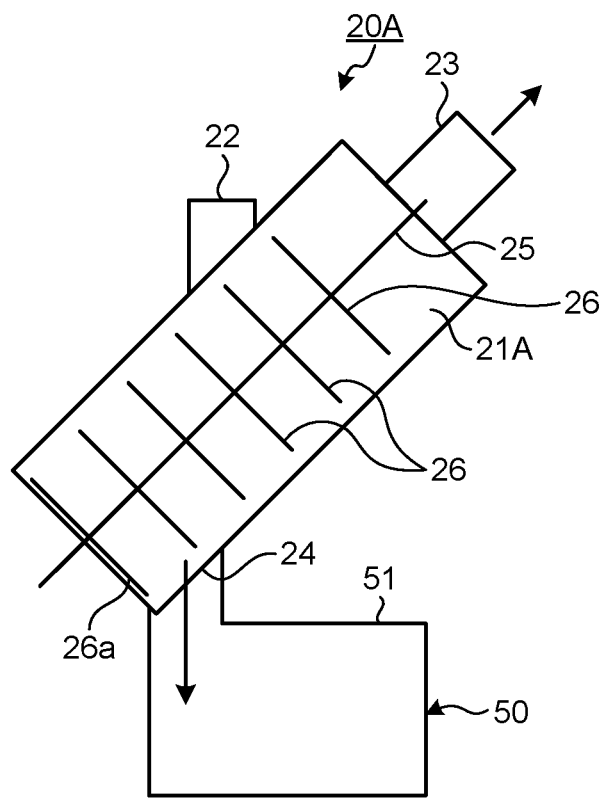
FIG. 4 is a cross-sectional view of a feather separation part in a feather separation system according to Modified Example 2 of the embodiment in a vertical direction.

In the above embodiment, the feather separation part 20 is arranged so that the rotating shaft 25 overlaps the vertical direction (an angle of 90° with respect to the horizontal direction). The present invention, however, is not limited thereto. FIG. 4 is a cross-sectional view of a feather separation part 20A in a feather separation system according to Modified Example 2 of the embodiment in a vertical direction. In FIG. 4 and the following description of the feather separation part 20A, the same signs are assigned and description is omitted for constitutions similar to the embodiment.

The feather separation part 20A includes a separation tank 21A made of a cylinder, a feather charge part 22, a feather discharge part 23, a rotating shaft 25 having a plurality of stirring rods 26 at different positions, and a covering discharge part 24. In the feather separation part 20A, the separation tank 21A is arranged so that the rotating shaft 25 is obliquely arranged. Arranging the separation tank 21A so that the rotating shaft 25 is oblique results in the longer falling time of the covering 3 that covers the feathers 2 and thus the number of mechanical contacts with the stirring rods 26 is also increased. This can improve separation efficiency. The inclination angle of the rotating shaft 25 is preferably 15° or more and 80° or less from the horizontal direction and further preferably 30° or more and 60° or less from the horizontal direction.

Figure 5A:
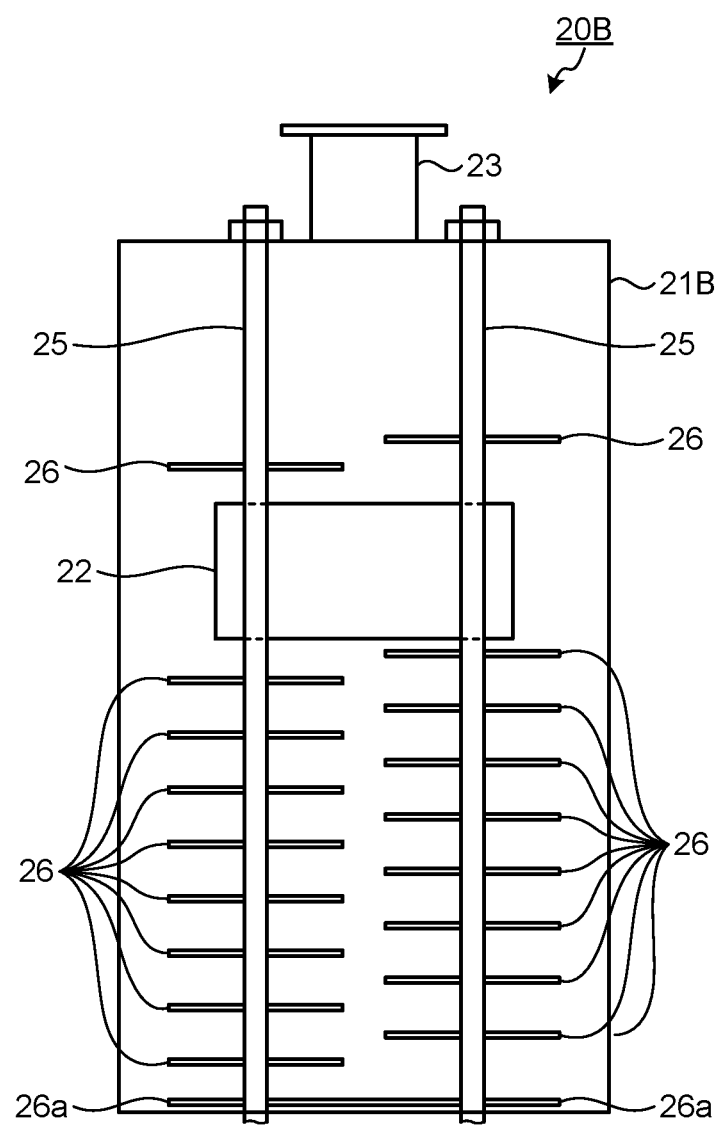
FIG. 5A is a cross-sectional view of a feather separation part in a feather separation system according to Modified Example 3 of the embodiment in a vertical direction.
Figure 5B:
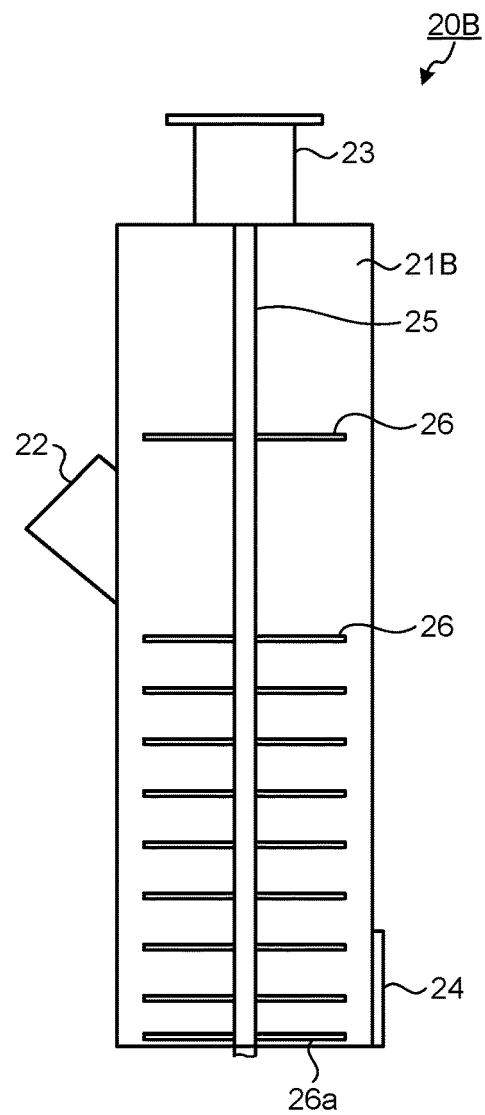
FIG. 5B is a cross-sectional view in a vertical direction orthogonal to the cross-section illustrated in FIG. 5A.
Figure 5C:
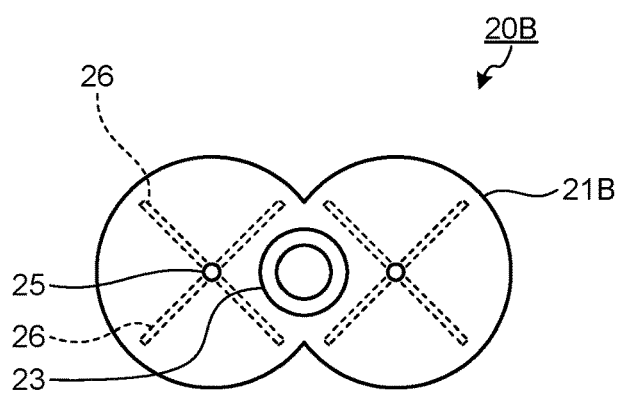
FIG. 5C is a top view of FIG. 5A.

In the above embodiment, the separation tank 21 of the feather separation part 20 is constituted of one cylinder. However, the separation tank 21 may also be made of two cylinders joined at the sides FIG. 5A is a cross-sectional view of a feather separation part 20B in a feather separation system according to Modified. Example 3 of the embodiment in a vertical direction. FIG. 5B is a cross-sectional view in a vertical direction orthogonal to the cross-section illustrated in FIG. 5A. FIG. 5C is a top view of a separation tank 21B in FIG. 5A. In FIG. 5A to FIG. 5C and in the following description of the feather separation part 20B, the same signs are assigned and description is omitted for constitutions similar to the embodiment.

In the feather separation part 20B, the separation tank 21B has a shape formed by joining two cylinders at the sides of the two cylinders, that is, a cocoon shape and the rotating shaft 25 is located at the center of each of the two cylinders. In the two cylinders, a distance between the centers of the cylinders, that is, a distance between the rotating shafts 25 arranged at the centers of the cylinders is preferably 70% or more and 90% or less of the cylinder inner diameter of the stirring rods 26. In addition, the stirring rods 26 attached to each of the rotating shafts 25 are attached at different heights so as to avoid interfering with each other. Forming the separation tank 21B in the cocoon shape and providing the respective rotating shafts 25 at the center of each of the two cylinders allow the separation efficiency to be more improved. Rotating the rotating shafts 25 in the same direction in each of the cylinders allows the stirring rods 26 to move each other in opposite directions near the position where the cylinders are connected. A particularly high stirring effect acts around this position and the efficiency of separation is further improved.

Figure 6:
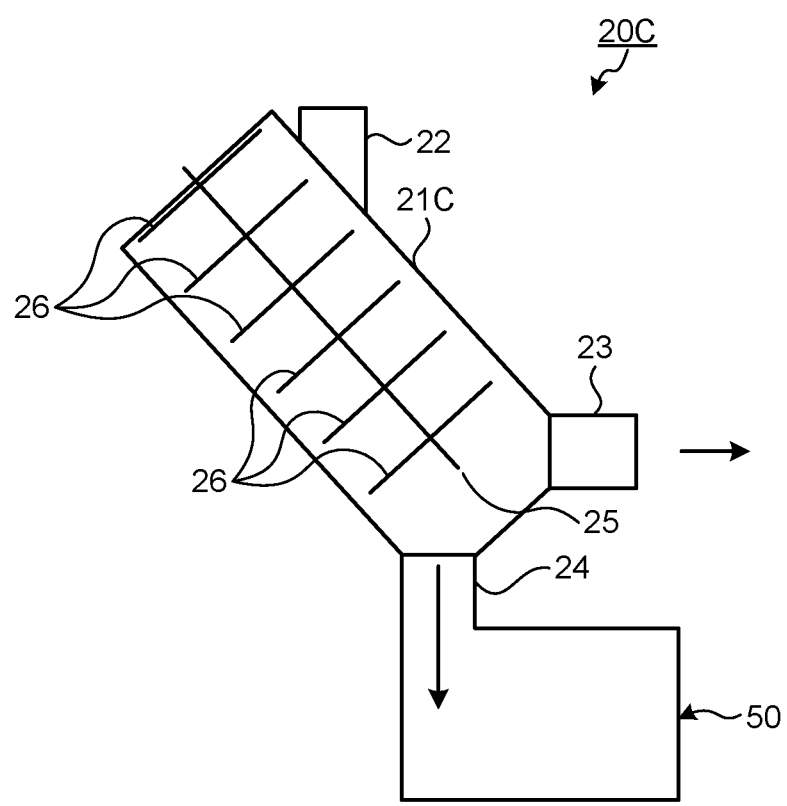
FIG. 6 is a cross-sectional view of a feather separation part in a feather separation system according to Modified Example 4 of the embodiment in a vertical direction.

In addition, in the above embodiment, the feather discharge part 23 is arranged at the upper part of the separation tank 21B. However, the arrangement is not limited thereto. FIG. 6 is a cross-sectional view of a feather separation part 200 in a feather separation system according to Modified Example 4 of the embodiment in a vertical direction. In FIG. 6 and the following description of the feather separation part 20C, the same signs are assigned and description is omitted for constitutions similar to the embodiment.

A feather separation part 200 includes a separation tank 210 including one cylinder, a feather charge part 22 attached to the upper part of the separation tank 21C, a feather discharge part 23 attached to the lower part of the separation tank 21C, a rotating shaft 25 having a plurality of stirring rods 26 at different positions, a covering discharge part 24, and a collection part 50 for collecting the covering discharged from the covering discharge part 24. In the feather separation part 200, the separation tank 210 is arranged so that the rotating shaft 25 is obliquely arranged. In addition, the feather charge part 22 includes a blowing means for introducing the airflow into the separation tank 21C and functions as a blowing part.

In the feather separation part 20C, the separation tank 210 is arranged so that the rotating shaft is oblique and the feather discharge part 23 is provided at the lower part of the separation tank 210 that is the downstream side of the airflow. In the case of such a constitution, the feathers to be separated from the covering are also efficiently separated.

Consequently, as described above, the feather separation system according to the present invention can be suitably used in the case where feathers used as the filling for bedding or clothing are recycled. A feather separation method using this system allows the feathers to be efficiently separated. Thus, the recycled feathers can be efficiently produced.

EXAMPLES

Subsequently, a feather separation system according to the present invention and a method for separating feathers and a method for producing recycled feathers using the feather separation system will be described in more detail with reference to Examples.

The invention is not limited to Examples described below. The feather separation part of the feather separation system used in Examples described below has the structures illustrated in FIGS. 5A to 5C.
(Raw Material)

As a raw material, five long-sleeved down jackets having a size with a width of about 5 cm to about 6 cm and a length of about 15 cm to about 50 cm in which bag-shaped products are arranged at arm parts and a body part are used. The feathers used in the down jackets are feathers having a down ratio of 90%.

(Cutting Part)

A cutting part includes a shear cutter and has a structure in which the down jackets are vertically and horizontally cut in two stages. The individual pieces cut in the cutting part were charged into the feather separation part having the structure illustrated in FIGS. 5A to 5C in a proportion of 1500 g/min (feathers: 300 g and covering and others: 1200 g).
(Feather Separation Part)

The feather separation part has the following structure.
Separation tank shape: Cylinder-joined cocoon-shaped cross-section.
Separation tank size: Cylinder diameter 500 mm, distance between centers of two cylinders 400 mm, and height 1600 mm
Feather charge part position: 820 mm from the lower surface of the separation tank
Feather charge part size: Length 250 mm and width 550 mm
Rotating shaft size: Diameter 50 mm
Stirring rod size: Diameter 8 mm and length 215 mm (rotating diameter 480 mm)
Number of stirring rods attached below feather charge part: 9 pairs, pitch 100 mm
Stirring rod attachment position below feather charge part: Uppermost stage is 10 mm below the lower surface of feather charge part.
Stirring rod attachment position above the charge part: Upper part at 100 mm above the upper surface of feather charge part
Covering discharge part location: Lowermost part of separation tank
Covering discharge part size: Length 220 mm and width 530 mm Example 1

The cutting size of the down jackets was varied from 10 mm square to 200 mm square and the feathers covered with the down jacket fabric were separated by the feather separation system described above. The system was operated at a rotational speed of the stirring rods of 800 rpm and an air velocity of the airflow of 0.3 m/sec. Performance was evaluated by a collection ratio, a down ratio, and an amount of contamination other than feathers. The results are listed in Table 1.

Collection ratio (% by mass)=Amount of obtained feathers/Amount of charged feathers×100

Down ratio (% by mass)=Amount of obtained down/Amount of obtained feathers×100

Amount of contamination other than feathers (% by mass)=(Discharged amount from feather discharge part−Amount of obtained feathers)/Discharged amount from feather discharge part×100

TABLE 1

| | | | | | | |
|---|---|---|---|---|---|---|
| Conditions | Cut size | 10 mm | 25 mm | 50 mm | 100 mm | 200 mm |
| | Rotation speed of stirring rods | 800 rpm | 800 rpm | 800 rpm | 800 rpm | 800 rpm |
| | Air velocity | 0.3 m/sec | 0.3 m/sec | 0.3 m/sec | 0.3 m/sec | 0.3 m/sec |
| Results | Collection ratio (% by mass) | 92% | 92% | 90% | 60% | 40% |
| | Down ratio (% by mass) | 50% | 75% | 90% | 90% | 90% |

| | | | | | | | |
|---|---|---|---|---|---|---|---|
| Amount of contamination other than feathers (% by mass) | | 1% or less | 1% or less | 1% or less | 1% or less | 1% or less | |

As listed in Table 1, it was confirmed that as the cut size became smaller, the collection ratio became higher and the down ratio became lower. It is conceivable that setting the cut size to a smaller size results in also cutting the feather branches of the down balls included in the feathers and thus the down ratio is lowered. On the other hand, in the case where the cut size was larger, the proportion of the bag-shaped product without an opening became larger and thus the collection ratio was lowered.

Example 2

The down jacket cut size was fixed at 50 mm square, the air velocity of the airflow was fixed at 0.3 m/sec, and the rotation speed of the stirring rods was varied from 100 rpm to 1000 rpm to separate the feathers. The results are listed in Table 2.

TABLE 2

| | | | | | | | |
|---|---|---|---|---|---|---|---|
| Conditions | Cut size | 50 mm | 50 mm | 50 mm | 50 mm | 50 mm | 50 mm |
| | Rotation speed of stirring rods | 100 rpm | 200 rpm | 300 rpm | 400 rpm | 500 rpm | 600 rpm |
| | Air velocity | 0.3 m/sec | 0.3 m/sec | 0.3 m/sec | 0.3 m/sec | 0.3 m/sec | 0.3 m/sec |
| Results | Collection ratio (% by mass) | 75% | 78% | 79% | 80% | 82% | 85% |
| | Down ratio (% by mass) | 90% | 90% | 90% | 90% | 90% | 90% |
| | Amount of contamination other than feathers (% by mass) | 1% or less | 1% or less | 1% or less | 1% or less | 1% or less | 1% or less |

| | | | | | | |
|---|---|---|---|---|---|---|
| Conditions | Cut size | 50 mm | 50 mm | 50 mm | 50 mm | |
| | Rotation speed of stirring rods | 700 rpm | 800 rpm | 900 rpm | 1,000 rpm | |
| | Air velocity | 0.3 m/sec | 0.3 m/sec | 0.3 m/sec | 0.3 m/sec | |
| Results | Collection ratio (% by mass) | 88% | 90% | 90% | 90% | |
| | Down ratio (% by mass) | 90% | 90% | 90% | 90% | |
| | Amount of contamination other than feathers (% by mass) | 1% or less | 1% or less | 1% or less | 1% or less | |

As listed in Table 2, it was confirmed that as the rotation speed of the stirring rods became higher, the collection ratio and the down ratio became higher. As the rotation speed of the stirring rods becomes higher, air in the separation tank is more stirred, mechanical contact between the feathers covered with the covering and the stirring rods is more frequently occurred, the separation is more promoted, and thus the collection ratio increases more.

Example 3

The down jacket cut size was fixed at 50 mm square, the rotation speed of the stirring rods was fixed at 800 rpm, and the air velocity of the airflow was varied from 0.1 m/sec to 1.0 m/sec to separate the feathers. The results are listed in Table 3.

TABLE 3

| Conditions | Cut size | 50 mm | 50 mm | 50 mm | 50 mm | 50 mm | 50 mm |
|---|---|---|---|---|---|---|---|
| | Rotation speed of stirring rods | 800 rpm | 800 rpm | 800 rpm | 800 rpm | 800 rpm | 800 rpm |
| | Air velocity | 0.1 m/sec | 0.15 m/sec | 0.2 m/sec | 0.25 m/sec | 0.3 m/sec | 0.35 m/sec |
| Results | Collection ratio (% by mass) | 50% | 60% | 72% | 85% | 90% | 90% |
| | Down ratio (% by mass) | 90% | 90% | 90% | 90% | 90% | 90% |
| | Amount of contamination other than feathers (% by mass) | 1% or less | 1% or less | 1% or less | 1% or less | 1% or less | 3% |

| Conditions | Cut size | 50 mm | 50 mm | 50 mm | 50 mm |
|---|---|---|---|---|---|
| | Rotation speed of stirring rods | 800 rpm | 800 rpm | 800 rpm | 800 rpm |
| | Air velocity | 0.4 m/sec | 0.5 m/sec | 0.8 m/sec | 1.0 m/sec |
| Results | Collection ratio (% by mass) | 92% | 93% | 93% | 94% |
| | Down ratio (% by mass) | 90% | 90% | 90% | 90% |
| | Amount of contamination other than feathers (% by mass) | 4.50% | 5.50% | 8% | 10% |

As listed Table 3, it was found that although the collection ratio became higher as the airflow velocity became higher, the amount of contaminations other than the feathers, for example, cut pieces of fabrics serving as the covering and lint increased in the feathers collected at the feather discharge part.

REFERENCE SIGNS LIST

1 Product
2 Feathers
3 Covering
10 Cutting Part
11 Cutter
12, 30 Conveying Part
20, 20A, 20B, 20C Feather Separation Part
21 Separation Tank
22 Feather Charge Part
23 Feather Discharge Part
24 Covering Discharge Part
25 Rotating Shaft
26 Stirring Rod
26a Scraping Rod
40 Feather Collection part
41 Collection Tank
42, 52 Charge Part
43 Ventilation Opening
50 Covering Collection part
51 Storing Part
60, 61 Airflow Introduction Part
100, 100D Feather Separation System

The invention claimed is:

1. A feather separation system for separating feathers from a bag-shaped product that has a covering and contains feathers, the feather separation system comprising:
   a cutting part configured to cut the product into individual pieces so that at least a part of the covering is open;
   a feather separation part configured to separate the individual pieces of the product into the feathers and the covering; and
   an airflow introduction part configured to introduce airflow to the feather separation part,
   wherein the cutting part is configured to cut the covering of the product so that an area S of the covering of the product is larger than 1 cm$^2$ and less than 400 cm$^2$, and D/L is in a range of D/L<10, wherein D is a diameter of a smallest circumscribed circle of the individual pieces of the cut covering and L is a distance between smallest circumscribed parallel lines of the individual pieces of the cut covering.

2. The feather separation system according to claim 1, further comprising:
   a feather collection part configured to store the separated feathers; and
   a covering collection part configured to store the separated covering.

3. The feather separation system according to claim 2, wherein the airflow introduction part is connected to the feather collection part.

4. The feather separation system according to claim 1, wherein the feather separation part comprises
- a separation tank having a cylindrical shape at least in a portion of the separation tank,
- a feather charge part configured to charge the cut individual pieces,
- a feather discharge part configured to discharge the separated feathers,
- a rotating shaft located at a center of the cylindrical portion of the separation tank, the rotating shaft including a plurality of stirring rods at different positions in a height direction, and
- a covering discharge part configured to discharge the separated covering.

5. The feather separation system according to claim 4, wherein the stirring rods are provided at least at a lower part lower than the feather charge part.

6. The feather separation system according to claim 4, wherein the separation tank has a shape formed by joining together two cylinders which each contain a rotating shaft that is provided at each center of the two joined cylinders.

7. The feather separation system according to claim 4, wherein a rotation speed of the rotating shaft is 100 rpm or more and 1000 rpm or less.

8. The feather separation system according to claim 4, wherein a stirring rod having a function of preventing the covering from mixing into the feather discharge part are provided at an upper part of the rotating shaft above the feather charge part.

9. The feather separation system according to claim 4, wherein a stirring rod arranged at a lowermost part among the stirring rods is a scraping rod for the covering separated from the feathers.

10. The feather separation system according to claim 4, wherein the separation tank is obliquely arranged so that the rotating shaft forms an angle of 15° to 80° from a horizontal direction.

11. The feather separation system according to claim 4, wherein the airflow introduction part is configured to introduce airflow having a velocity of 0.1 m/second or more and 1.0 m/second or less inside the separation tank.

12. A feather separation method for separating feathers from a bag-shaped product that has a covering and contains feathers, the feather separation method comprising:
- a cutting step of cutting the product into individual pieces so that at least a part of the covering is open;
- a feather separating step of separating the individual pieces of the product into the feathers and the covering by a stirring means and airflow; and
- a feather collecting step of collecting the separated feathers, wherein the cutting step includes cutting the covering of the product so that an area S of the covering of the product is more than 1 cm$^2$ and less than 400 cm$^2$, and D/L is in a range of D/L<10, wherein D is a diameter of a smallest circumscribed circle of the individual pieces of the cut covering and L is a distance between smallest circumscribed parallel lines of the individual pieces of the cut covering.

13. The feather separation method according to claim 12, wherein the separation step includes carrying feathers alone together with flow of air from a separation tank by forming a mixed state made of the covering, the feathers, and air with the stirring means in the separation tank and introducing the airflow in the separation tank.

14. The feather separation method according to claim 12, wherein the feather separation step includes separating the feathers by introducing the airflow having a velocity of 0.1 m/second or more and 1.0 m/second or less.

15. A method for producing recycle feathers, the method comprising the feather separation method according to claim 12.

* * * * *